US011934781B2

(12) United States Patent
He et al.

(10) Patent No.: US 11,934,781 B2
(45) Date of Patent: Mar. 19, 2024

(54) SYSTEMS AND METHODS FOR CONTROLLABLE TEXT SUMMARIZATION

(71) Applicant: Salesforce, Inc., San Francisco, CA (US)

(72) Inventors: Junxian He, Pittsburgh, PA (US); Wojciech Kryscinski, Palo Alto, CA (US); Bryan McCann, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 497 days.

(21) Appl. No.: 17/125,468

(22) Filed: Dec. 17, 2020

(65) Prior Publication Data

US 2022/0067284 A1 Mar. 3, 2022

Related U.S. Application Data (60) Provisional application No. 63/071,571, filed on Aug. 28, 2020.

(51) Int. Cl.
| | | |
|---|---|---|
| G06F 40/10 | (2020.01) | |
| G06F 40/143 | (2020.01) | |
| G06F 40/169 | (2020.01) | |
| G06F 40/284 | (2020.01) | |
| G06N 7/01 | (2023.01) | |
| G06F 3/0483 | (2013.01) | |

(52) U.S. Cl.
CPC ............ *G06F 40/284* (2020.01); *G06N 7/01* (2023.01); *G06F 3/0483* (2013.01)

(58) Field of Classification Search
USPC ............ 704/1–275; 382/128–190; 706/1–62, 706/900–903; 707/708–740
See application file for complete search history.

(56) References Cited

U.S. PATENT DOCUMENTS

| | | | |
|---|---|---|---|
| 9,037,590 | B2 | 5/2015 | Kumar et al. |
| 10,282,663 | B2 | 5/2019 | Socher et al. |
| 10,474,709 | B2 | 11/2019 | Paulus |
| 10,521,465 | B2 | 12/2019 | Paulus |
| 10,542,270 | B2 | 1/2020 | Zhou et al. |
| 10,558,750 | B2 | 2/2020 | Lu et al. |
| 10,565,305 | B2 | 2/2020 | Lu et al. |
| 10,565,306 | B2 | 2/2020 | Lu et al. |

(Continued)

OTHER PUBLICATIONS

Junxian He; CTRLSUM: Towards Generic Controllable Text Summarization; 2020 (Year: 2020).*

(Continued)

*Primary Examiner* — Marcellus J Augustin
(74) *Attorney, Agent, or Firm* — Haynes and Boone, LLP (57) ABSTRACT

Embodiments described herein provide a flexible controllable summarization system that allows users to control the generation of summaries without manually editing or writing the summary, e.g., without the user actually adding or deleting certain information under various granularity. Specifically, the summarization system performs controllable summarization through keywords manipulation. A neural network model is learned to generate summaries conditioned on both the keywords and source document so that at test time a user can interact with the neural network model through a keyword interface, potentially enabling multi-factor control.

14 Claims, 9 Drawing Sheets

(56) References Cited

U.S. PATENT DOCUMENTS

| | | | |
|---|---|---|---|
| 10,565,318 B2 | 2/2020 | Bradbury | |
| 10,565,493 B2 | 2/2020 | Merity et al. | |
| 10,573,295 B2 | 2/2020 | Zhou et al. | |
| 10,592,767 B2 | 3/2020 | Trott et al. | |
| 10,599,741 B2* | 3/2020 | Corlett | G06F 16/9535 |
| 10,699,060 B2 | 6/2020 | McCann | |
| 10,747,761 B2 | 8/2020 | Zhong et al. | |
| 10,776,581 B2 | 9/2020 | McCann et al. | |
| 10,783,875 B2 | 9/2020 | Hosseini-Asl et al. | |
| 10,817,650 B2 | 10/2020 | McCann et al. | |
| 10,839,284 B2 | 11/2020 | Hashimoto et al. | |
| 10,846,478 B2 | 11/2020 | Lu et al. | |
| 11,651,039 B1* | 5/2023 | Soubbotin | G06F 16/93 707/706 |
| 2002/0078090 A1* | 6/2002 | Hwang | G06F 16/353 715/201 |
| 2009/0150364 A1* | 6/2009 | Melander | G06F 40/143 |
| 2014/0250375 A1* | 9/2014 | Malik | G06F 16/345 715/254 |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0140240 A1 | 5/2017 | Socher et al. | |
| 2018/0096219 A1 | 4/2018 | Socher | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0268287 A1 | 9/2018 | Johansen et al. | |
| 2018/0268298 A1 | 9/2018 | Johansen et al. | |
| 2018/0336453 A1 | 11/2018 | Merity et al. | |
| 2018/0373987 A1 | 12/2018 | Zhang et al. | |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0188568 A1 | 6/2019 | Keskar et al. | |
| 2019/0213482 A1 | 7/2019 | Socher et al. | |
| 2019/0251431 A1 | 8/2019 | Keskar et al. | |
| 2019/0258714 A1 | 8/2019 | Zhong et al. | |
| 2019/0258939 A1 | 8/2019 | Min et al. | |
| 2019/0286073 A1 | 9/2019 | Asl et al. | |
| 2019/0355270 A1 | 11/2019 | McCann et al. | |
| 2019/0362020 A1 | 11/2019 | Paulus et al. | |
| 2020/0005765 A1 | 1/2020 | Zhou et al. | |
| 2020/0065651 A1 | 2/2020 | Merity et al. | |
| 2020/0084465 A1 | 3/2020 | Zhou et al. | |
| 2020/0089757 A1 | 3/2020 | Machado et al. | |
| 2020/0090033 A1 | 3/2020 | Ramachandran et al. | |
| 2020/0090034 A1 | 3/2020 | Ramachandran et al. | |
| 2020/0103911 A1 | 4/2020 | Ma et al. | |
| 2020/0104643 A1 | 4/2020 | Hu et al. | |
| 2020/0104699 A1 | 4/2020 | Zhou et al. | |
| 2020/0105272 A1 | 4/2020 | Wu et al. | |
| 2020/0117854 A1 | 4/2020 | Lu et al. | |
| 2020/0117861 A1 | 4/2020 | Bradbury | |
| 2020/0142917 A1 | 5/2020 | Paulus | |
| 2020/0175305 A1 | 6/2020 | Trott et al. | |
| 2020/0184020 A1 | 6/2020 | Hashimoto et al. | |
| 2020/0234113 A1 | 7/2020 | Liu | |
| 2020/0257757 A1* | 8/2020 | Chawla | G06F 40/20 |
| 2020/0272940 A1 | 8/2020 | Sun et al. | |
| 2020/0285704 A1 | 9/2020 | Rajani et al. | |
| 2020/0285705 A1 | 9/2020 | Zheng et al. | |
| 2020/0285706 A1 | 9/2020 | Singh et al. | |
| 2020/0285993 A1 | 9/2020 | Liu et al. | |
| 2020/0302178 A1 | 9/2020 | Gao et al. | |
| 2020/0302236 A1 | 9/2020 | Gao et al. | |
| 2020/0334334 A1 | 10/2020 | Keskar et al. | |
| 2020/0364299 A1 | 11/2020 | Niu et al. | |
| 2020/0372116 A1 | 11/2020 | Gao et al. | |
| 2020/0372319 A1 | 11/2020 | Sun et al. | |
| 2020/0372341 A1 | 11/2020 | Asai et al. | |
| 2020/0394212 A1* | 12/2020 | Sakaue | G06F 16/345 |

OTHER PUBLICATIONS

Devlin et al., "BERT: Pre-training of Deep Bidirectional Transformers for Language Understanding," arXiv preprint arXiv:1810.04805, pp. 1-14, 2018.

Fan et al., "Controllable Abstractive Summarization" In Proceedings of the 2nd Workshop on Neural Machine Translation and Generation, pp. 45-54, 2018.

Gehrmann et al., "Bottom-Up Abstractive Summarization," In Proceedings of EMNLP, pp. 4098-4109, Brussels, Belgium, 2018.

Lin, "Rouge: A Package for Automatic Evaluation of Summaries," In Text Summarization Branches Out, pp. 1-8, 2004.

Liu et al., "Controlling Length in Abstractive Summarization Using a Convolutional Neural Network," In Proceedings of EMNLP, Brussels, Belgium, pp. 4110-4119, 2018.

Narayan et al., "Ranking Sentences for Extractive Summarization with Reinforcement Learning," In Proceedings of NAACL-HLT, pp. 1747-1759, 2018.

Rush et al., "A Neural Attention Model for Sentence Summarization," In Proceedings of EMNLP, pp. 379-389, 2015.

Saito et al., "Length-controllable Abstractive Summarization by Guiding with Summary Prototype," arXiv preprint arXiv:2001.07331, pp. 1-8, 2020.

See et al., "Get to the Point: Summarization with Pointer-Generator Networks," In Proceedings of the 55th Annual Meeting of the Association for Computational Linguistics, pp. 1073-1083, 2017.

Tan et al., Progressive Generation of Long Text, arXiv preprint arXiv:2006.15720, pp. 1-16, 2020.

Yao et al., "Plan-and Write: Towards Better Automatic Storytelling," In The Thirty-Third AAAI Conference on Artificial Intelligence (AAAI-19), pp. 7378-7385, 2019.

International Search Report and Written Opinion from PCT/US2021/045385, dated Nov. 9, 2021, 15 pages.

He et al., "CTRLsum: Towards Generic Controllable Text Summarization", ARXIV.org, Cornell University Library, Dec. 8, 2020, pp. 1-35, XP081833067.

* cited by examiner

| Source or Reference | Control Aspect | Keywords (bolded) or Prompts and Model Output |
|---|---|---|
| *Source:* Hundreds of additional Iraqi troops are being sent to reinforce colleagues who are trying to fend off ISIS' attempt to overrun Iraq's largest oil refinery, a key paramilitary force said Tuesday. The reinforcements come four days after ISIS began attacking northern Iraq's Baiji oil refinery, a key strategic resource that has long been a target because the facility refines much of the fuel used by Iraqis domestically. The additional troops came from Camp Speicher, a fortified Iraqi base near the city of Tikrit, according to the media office of the Hasd Al-Shaabi militia. The reinforcements include two federal police regiments, an Iraqi military quick reaction force battalion and a regiment from Hasd Al-Shaabi. [ignoring 110 tokens] The refinery is 40 kilometers (25 miles) from Tikrit. | Entity | ISIS -- The reinforcements come four days after ISIS began attacking Baiji oil refinery.<br><br>Hasd Al-Shaabi -- The reinforcements come from Camp Speicher, a fortified Iraqi base near Tikrit. They include two federal police regiments, an Iraqi military quick reaction force battalion and a regiment from Hasd Al-Shaabi. |
| | Length | (Length bucket 0) Iraqi troops ISIS oil refinery [ come days attacking Baiji refinery ] base Tikrit -- The reinforcements come four days after ISIS began attacking Iraq's Baiji oil refinery. The additional troops came from Camp Speicher, a fortified Iraqi base near Tikrit. |
| | QA | [Q: Where did the additional troops come from? A:] -- Camp Speicher near the city of Tikrit. |
| *Reference:* multiple sclerosis is a degenerative condition of the central nervous system that affects nearly 2.5 million individuals in terms of their [ignoring 60 tokens] in this work we resort to regularized machine learning methods for binary classification and multiple output regression we propose a pipeline that can be used to predict the disease progression from patient reported measures . the obtained model is tested on a data set collected from patients currently enrolled in an ongoing funded project . | Contribution | [the main contributions of this paper are : ( 1 ) ] -- we propose a regularization - based data analysis pipeline for the prediction of the transition point between relapsing - remitting and secondary - progressive forms of multiple sclerosis ; ( 2 ) we test the performance of the proposed pipeline on a data set collected from patients currently enrolled in an ongoing funded project ; ( 3 ) we discuss the potential role of patient reported outcome measures ( _ proms _ ) in the study of the disease evolution . |
| *Reference:* an implantable intraocular pressure sensor system has a sealed geometric shape with an internal pressure at a first value . the sealed geometric shape has a first light permitting surface and a second flexible surface . a pair of photocells is located in the sealed geometric shape . a light shield is coupled to the second flexible surface . when the second flexible surface is deflected , a light measurement by the pair of photocells indicates an intraocular pressure condition . | Purpose | [the purpose of the present invention is] -- to provide an intraocular pressure measuring system that is small enough to be implanted in the eye of a patient |

*FIG. 6*

| Model | CNNDM | | arXiv | |
|---|---|---|---|---|
| | ROUGE-1/2/L | BERTScore | ROUGE-1/2/L | BERTScore |
| BART | 44.24/21.25/41.06 | 0.336 | 45.16/17.36/40.55 | 0.164 |
| CTRLsum (automatic) | 45.65/22.35/42.50 | 0.363 | 46.91/18.02/42.14 | 0.169 |
| LengthCode | 43.44/21.10/40.35 | 0.346 | 45.91/17.33/41.38 | 0.147 |
| CTRLsum (oracle entity) | 48.75/25.98/45.42 | 0.422 | --- | --- |
| CTRLsum (oracle length) | 46.26/22.60/43.10 | 0.365 | 47.58/18.33/42.79 | 0.173 |

FIG. 7

| Model | Success Rate (%) | | Factual Correctness | |
|---|---|---|---|---|
| | Lead-3 | Full-article | Important | Unimportant |
| BART | 61.4 | 29.0 | 98.0 | – |
| EntityCode | 61.2 | 33.8 | – | – |
| CTRLsum | 97.6 | 94.8 | 99.0 | 100.0 |

FIG. 8

| Model | CNNDM | | arXiv | |
|---|---|---|---|---|
| | MAD ↓ | PCC ↑ | MAD ↓ | PCC ↑ |
| BART | 1.20 | 0.00 | 1.08 | 0.00 |
| CTRLsum (automatic) | 1.25 | 0.00 | 0.98 | 0.00 |
| LengthCode | 1.17 | -0.02 | 1.06 | 0.00 |
| CTRLsum (+length) | 0.87 | 0.53 | 0.69 | 0.48 |

FIG. 9

| Model | NewsQA | SQuAD v1.1 |
|---|---|---|
| Supervised | | |
| SpanBERT | 73.0 | 94.6 |
| MatchLSTM | 49.6 | 70.0 |
| Zero-Shot | | |
| GPT2-Large (774M params, w/o fine-tuning) | 24.9 | 23.5 |
| BART (406M params, w/o fine-tuning) | 8.2 | 15.8 |
| BART (406M params, fine-tuned on CNNDM) | 32.6 | 41.7 |
| CTRLsum (406M params, trained on CNNDM) | 48.2 | 59.6 |

FIG. 10

| Model | Contribution | | Patent Purpose | |
|---|---|---|---|---|
| | ROUGE-1/2/L | BERTScore (P/R/F1) | ROUGE-1/2/L | BERTScore (P/R/F1) |
| BART (prompt) | 43.84/17.46/25.89 | 0.119/0.142/0.130 | 29.05/11.80/22.50 | 0.016/0.236/0.107 |
| CTRLsum (prompt+keyword) | 43.88/18.17/27.79 | 0.179/0.098/0.138 | 33.64/11.37/24.24 | 0.180/0.152/0.165 |

FIG. 11

| Model | CNNDM | | arXiv | | BIGPATENT | |
|---|---|---|---|---|---|---|
| | ROUGE-1/2/L | BS | ROUGE-1/2/L | BS | ROUGE-1/2/L | BS |
| CTRLsum (Oracle Keywords) | 64.65/40.42/60.92 | 0.555 | 56.08/25.31/50.23 | 0.208 | 55.19/26.62/47.10 | 0.291 |
| BART | 44.24/21.25/41.06 | 0.336 | 45.16/17.36/40.55 | 0.164 | 45.83/19.53/39.47 | 0.187 |
| PEGASUS | 44.17/21.47/41.11 | — | 44.70/17.27/23.80 | — | 53.63/33.16/42.25 | — |
| CTRLsum (Automatic Keywords) | 45.65/22.35/42.50 | 0.363 | 46.91/18.02/42.14 | 0.169 | 45.80/18.68/39.09 | 0.188 |

FIG. 12

| Model | Important Entity | | Unimportant Entity | | Purpose | |
|---|---|---|---|---|---|---|
| | CA | CR | CA | CR | CA | CR |
| CTRLsum | 3.5 | 4.2 | 4.0 | 4.0 | 4.0 | 3.7 |
| BART | 3.8 | 3.7* | 1.3* | 1.2* | 4.0 | 3.0* |

FIG. 13

| Model | CNNDM | arXiv | BIGPATENT |
|---|---|---|---|
| | FAC/REL/FLU/COH | FAC/REL/FLU/COH | FAC/REL/FLU/COH |
| CTRLsum (Automatic Keyword) | 4.6/4.6/4.1/4.1 | 4.1/4.3/4.1/4.1 | 4.2/4.2/4.0/4.1 |
| BART | 4.6/4.7/4.2/4.1 | 4.1/4.1/3.9/4.0 | 4.2/4.3/4.1/4.0 |
| CTRLsum (Oracle Keyword) | 4.6/4.7/4.1/4.1 | 4.2/4.3/4.0/4.1 | 4.2/4.2/4.2*/4.1 |

FIG. 14

SYSTEMS AND METHODS FOR CONTROLLABLE TEXT SUMMARIZATION

CROSS REFERENCE(S)

This application is a nonprovisional of and claims priority under 35 U.S.C. 119 to U.S. provisional application No. 63/071,571, filed on Aug. 28, 2020, which is hereby expressly incorporated by reference herein in its entirety.

TECHNICAL FIELD

The present disclosure relates generally to machine learning models and neural networks, and more specifically, to a controllable text summarization framework.

BACKGROUND

Text summarization compresses a document into a short paragraph or sentence as a "summary" of the document, while the summary is expected to preserve the core information from the document. Some existing summarization systems extracts important sentences from the document to form a summary, while some other existing summarization systems generate a summary from scratch by formulating sentences of their own choice. These summarization systems generate the summary solely depends on the input document, thus often resulting in one version of summary for the input document. The universal version of summary sometimes may fail to capture different interests of users who request the summary.

BRIEF DESCRIPTION OF THE DRAWINGS

FIG. 6 provides qualitative examples showing resulting summaries generated based on different user-controlled configuration parameters, according to one embodiment described herein.

In the figures and appendix, elements having the same designations have the same or similar functions.

DETAILED DESCRIPTION

Existing summarization systems often generate the summary solely depends on the input document, thus often resulting in one version of summary for the input document. The universal version of summary sometimes may fail to capture different interests of users who request the summary. For example, if the document includes a news article on sports news, a user may want the summary to focus on a specific player, or summaries of different lengths given the user's interest or available time. The user preference to different versions of the summary can be extended to other controlling factors such as topics or certain sections (when summarizing scientific papers or books) as well.

In view of the need to generate customized summary of a document that reflects user preference, embodiments described herein provide a flexible controllable summarization system that allows users to control the generation of summaries without manually editing or writing the summary, e.g., without the user actually adding or deleting certain information under various granularity. Specifically, the summarization system performs controllable summarization through keywords manipulation. A neural network model is learned to generate summaries conditioned on both the keywords and source document so that at test time a user can interact with the neural network model through a keyword interface, potentially enabling multi-factor control.

For example, controllable summarization system allows the users to control and manipulate the summaries from the model. A user may enter control tokens in the form of a set of keywords or descriptive prompts via a user interface, which may be used to generate a customized summary that reflects the user preference of a source article. At training time, the model learns to predict summaries conditioned on both the source document and keywords that serve as external guidance. During inference, keywords and optional prompts (e.g., entered by a user), which are the target prefix to constrain decoding, are combined as control tokens to convey user preferences in summary generation.

In one embodiment, the user of keywords and prompts may be complementary. For example, the user may enter or select entity names as keywords or vary the number of keywords to control entities and length respectively. A model may be trained using only keywords as additional input which can be identified from training summaries. The process requires neither extra human annotations nor pre-defining control aspects for training, yet is quite flexible to achieve a broad scope of text manipulation. In contrast, most existing summarization systems either do not allow user input to control the summarization process, or require pre-defined "control codes" (see Fan et al., Controllable abstractive summarization, in Proceedings of the 2nd Workshop on Neural Machine Translation and Generation, 2018; Liu et al., Controlling length in abstractive summarization using a convolutional neural network, in Proceedings of EMNLP, 2018; Keskar et al., Ctrl: A conditional transformer language model for controllable generation. arXiv preprint arXiv: 1909.05858, 2019, which are all hereby expressly incorporated by reference in their entirety), which in turn requires the system to collect annotations for training and cannot generalize to unseen control aspects such as different types of articles or different types of control commands at test time.

As used herein, the term "prompt" is used to refer to pre-defined text sequences used as a target prefix to constrain decoding of the summarization system. For example, the prompt "the main contributions of this paper are: (1)" may be used to constrain decoding for summarizing a list of contributions of scientific papers.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Controllable Summarization Overview

Figure 1A:
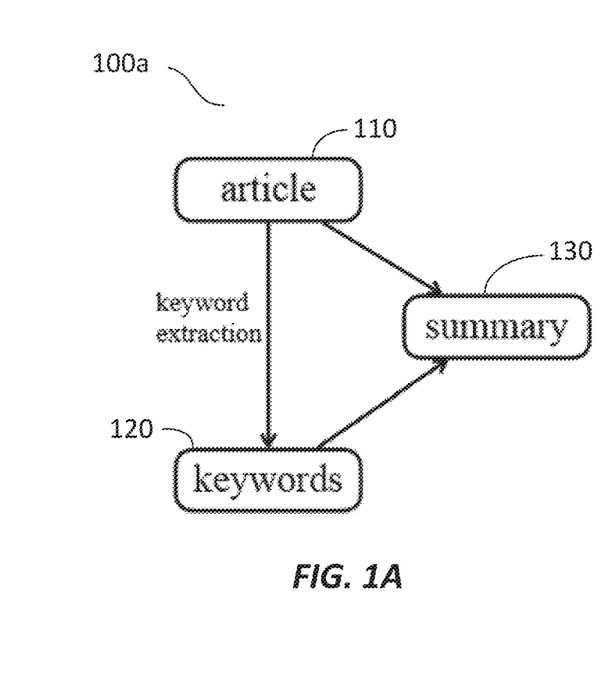
FIG. 1A shows a block diagram illustrating an example neural network model diagram of the summarization system, according to embodiments described herein.

FIG. 1A shows a block diagram illustrating an example neural network model diagram 100a of the summarization system, according to embodiments described herein. Traditionally, unconstrained neural summarization methods are trained to learn the conditional distribution p(y|x), where x and y represent a source document, such as an article and the summary, respectively. The generated summaries depend solely on the document x without human involvement. To control the output summaries, additional control tokens, such as the keywords z, may be used to represent user preferences. Thus, diagram 100a shows that at training stage, the neural network model for controllable summarization is learned to model the probability p(y|x, z), where x denotes the source document article 110, y denotes the generated summary 130, and z denotes the keywords 120 that are extracted from the article 110. Thus, the probability p(y|x, z) denotes the summary distribution conditioned on both the source document 110 and keywords 120.

Figure 1B:
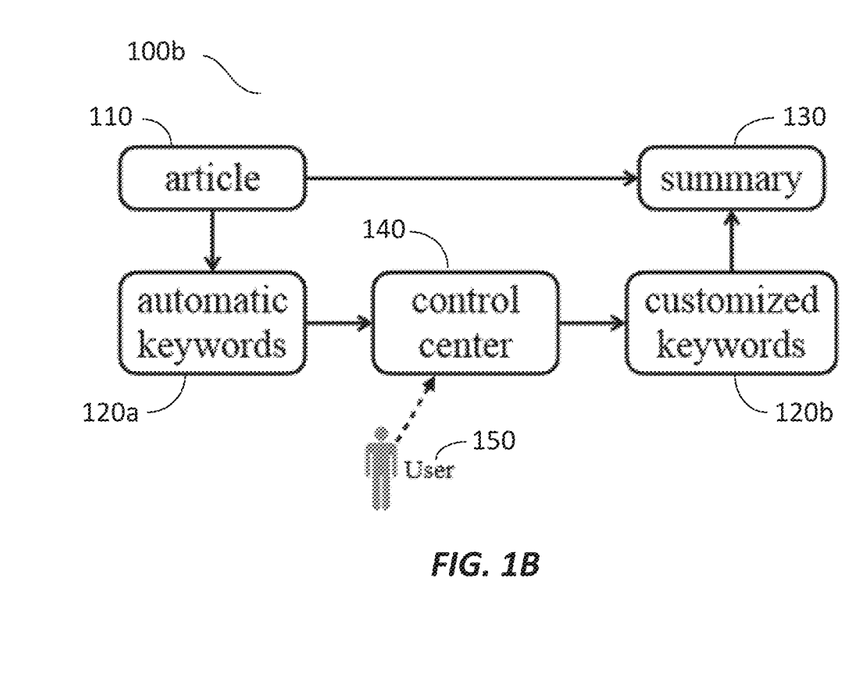
FIG. 1B shows a block diagram illustrating a controlling workflow for the summarization system at test time, according to embodiments described herein.

FIG. 1B shows a block diagram 100b illustrating a controlling workflow for the summarization system at test time, according to embodiments described herein. Diagram 100b shows that at inference stage, a keyword manipulation mechanism is used to bridge users and the keywords interface, referred to as the "control center" 140. Specifically, keywords 120a are automatically extracted from the source document, e.g., article 110, which may be (optionally) presented to a user 150 at a user interface of the control center 140. Then the user 150 may interact with the automatic keywords 120a through the control center 140 to insert control tokens z.

In one embodiment, the control tokens z may include keywords as extra inputs during training and inference. Control tokens can also optionally include prompts at test time to further constrain the decoding process. Control tokens z—in the form of keywords, prompts, or a combination of both—may act as an interface between users and an otherwise black-box neural model, providing a flexible way for users to explicitly control automatic summarization.

For example, the user 150 may configure a target length (word limit) of the summary, prompting the control center 140 to remove a number of automatic keywords to generate a shorter summary. Or the control center 140 may choose to only keep certain entity-related keywords if the user 150 indicates interests in the particular entity name. In addition, the user 150 can also edit the customized keywords, which allows for more flexible customized summarization without the user manually editing the summary directly.

Figure 2:
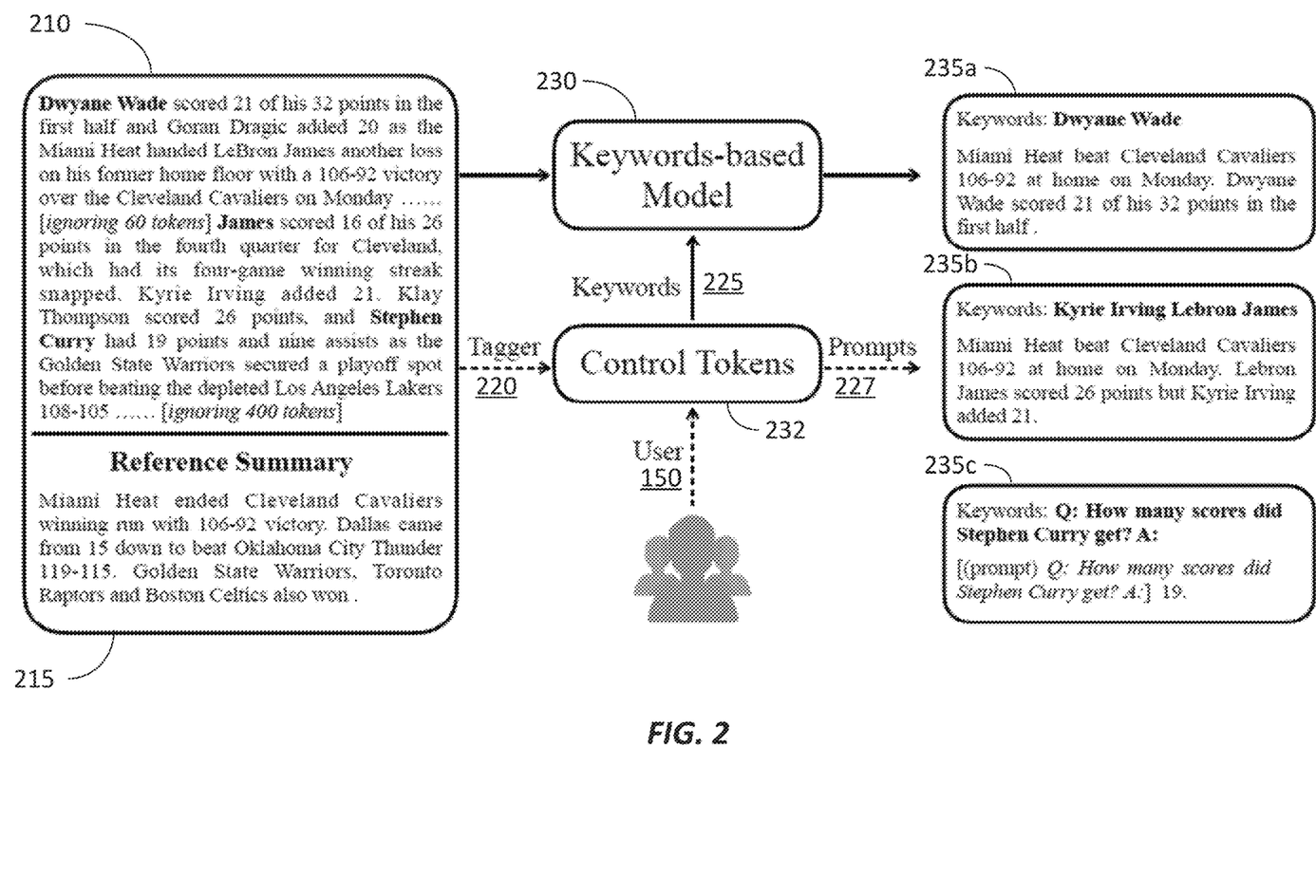
FIG. 2 shows an example diagram illustrating the inference stage of a controllable summarization keywords-based model, according to embodiments described herein.

FIG. 2 shows an example diagram illustrating the inference stage of a controllable summarization keywords-based model 230, according to embodiments described herein. FIG. 2 shows an NBA basketball news article 210, and the reference summary 215 describes several match results. However, fans of certain basketball stars in these teams such as Lebron James or Stephen Curry might only be interested in the matches they played and would like to know the player's scores as well. Thus, user 150 may provide such user preferences through control tokens 232 that may control the summary generation at the keywords-based model 230.

Specifically, at training time, the keywords-based model may learn to predict summaries conditioned on both the source document and keywords that serve as external guidance. For example, a ground-truth summary may be used to identify keywords in the source document. In this example, the reference summary 215 may be used for training. In another example, a ground-truth summary that is customized to user preference on the user's interested player names such as "Dwyane Wade," "James" or "Stephen Curry" may be used for training with the source document 210.

During inference, keywords and optional prompts, which are the target prefix to constrain decoding, are combined as control tokens 232 to convey user preferences. Specifically, the keywords provide a generic interface to control multiple aspects of summaries, which allows the user to optionally rely on automatically extracted keywords, user provided keywords, or a combination of both. This method provides clean separation of test-time user control and the training process, including pretraining. Consequently, the keyword-based model 230 can be adapted to new use cases without changing model parameters. For example, even if the keyword-based model 230 may not be trained during training to specifically focus on controlling entities or length.

For example, keywords 225 may be input to the keywords-based model 230 during training and testing, while prompts 227 are optionally used at test time. The dashed lines represent optional paths where control tokens 232 may come from the source article 210, user 150, or both. The keywords-based model 230 may then generate different versions of summaries 235a-c, depending on different keywords 225 or prompts 227 during inference time.

Computer Environment

Figure 3:
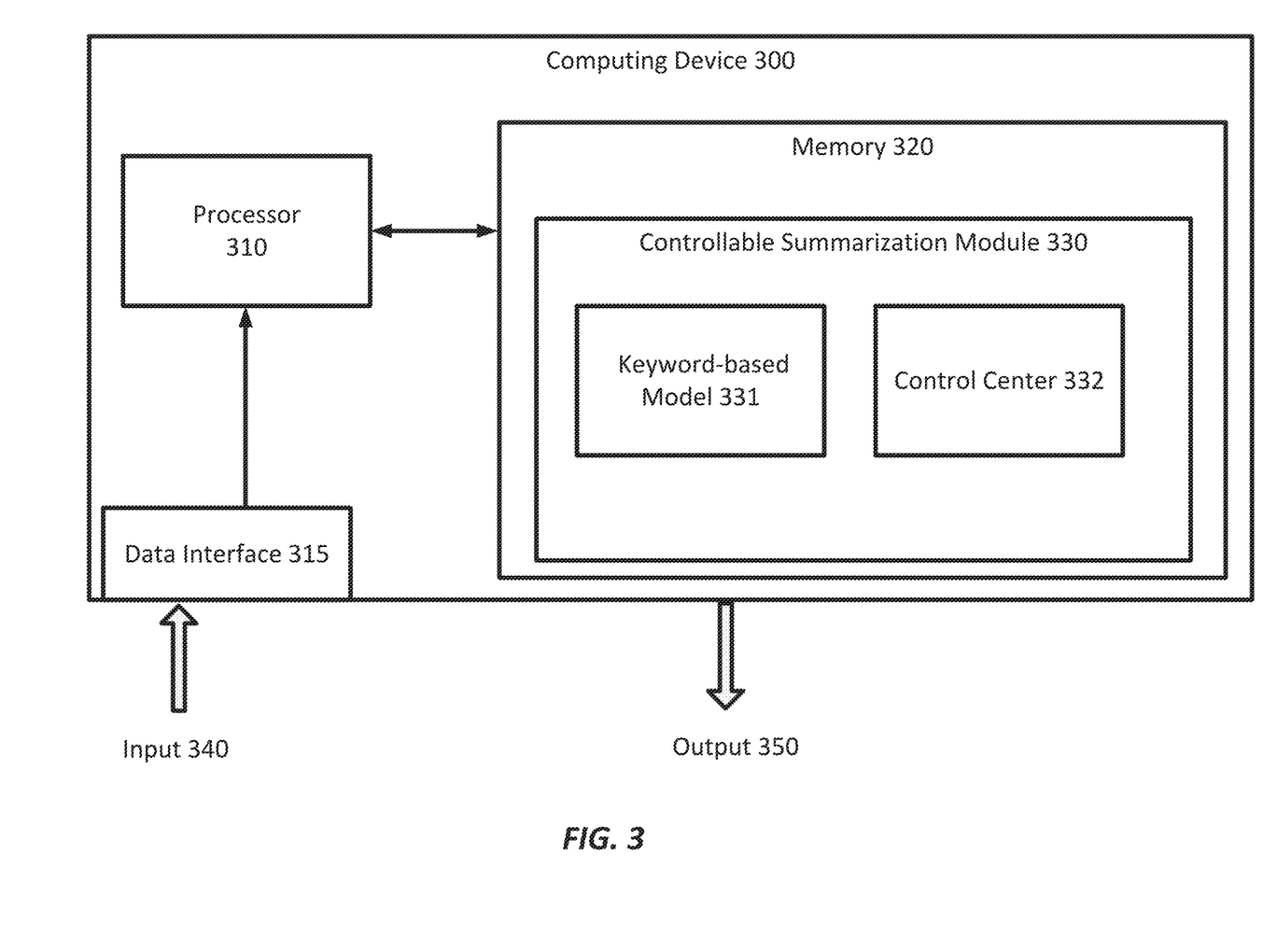
FIG. 3 is a simplified diagram of a computing device for implementing the summarization system, according to some embodiments.

FIG. 3 is a simplified diagram of a computing device for implementing the summarization system, according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

In some examples, memory 320 may include non-transitory, tangible, machine readable media that includes executable code that when run by one or more processors (e.g., processor 310) may cause the one or more processors to perform the methods described in further detail herein. For example, as shown, memory 320 includes instructions for a control summarization module 330 that may be used to implement and/or emulate the systems and models, and/or to implement any of the methods described further herein. In some examples, the controllable summarization module 330, may receive an input 340, e.g., a source document. The data interface 315 may be any of a user interface that receives a user entered input, or a communication interface that may receive or retrieve a document from a database. The controllable summarization module 330 may generate an output 350, e.g., a summary.

In some embodiments, the controllable summarization module 330 includes a keyword-based module 331, and a control center 332. For example, the keyword-based model 331 may be similar to model 230 in FIG. 2, which may employ different keywords extraction mechanisms at training and test time. In one implementation, the control center 332 may communicate with the data interface 315 and serve as a filter to select customized keywords from automatic keywords based on users' preference obtained from the data interface 315.

In some examples, the controllable summarization module 330 and the sub-modules 331-232 may be implemented using hardware, software, and/or a combination of hardware and software.

Controllable Summarization Work Flows

Figure 4:
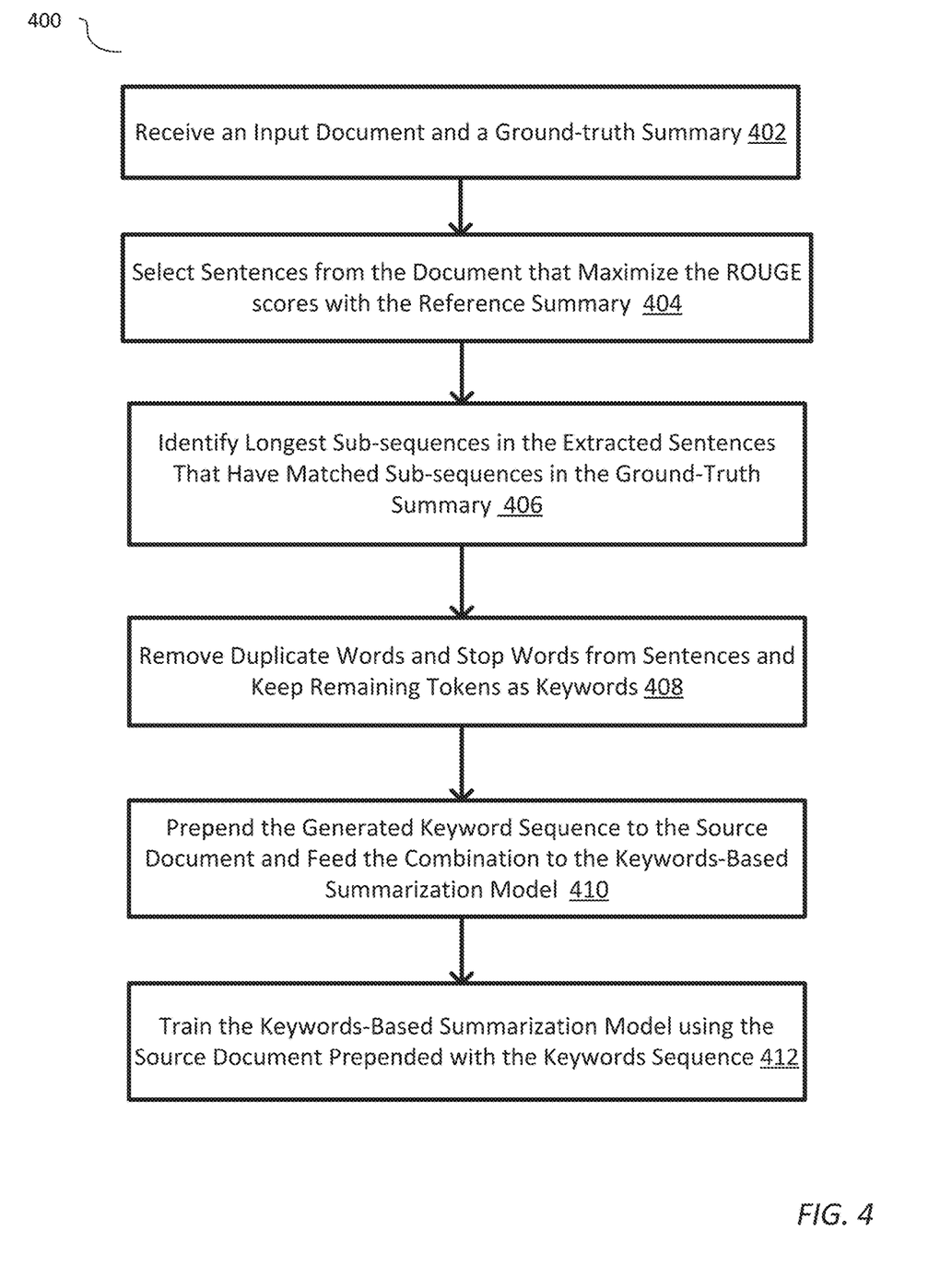
FIG. 4 is a simplified logic flow diagram illustrating a method for training the keywords-based summarization model shown in FIG. 2, according to some embodiments described herein.

FIG. 4 is a simplified logic flow diagram illustrating a method for training the keywords-based summarization model shown in FIG. 2, according to some embodiments described herein. One or more of the processes 402-412 of method 400 may be implemented, at least in part, in the form of executable code stored on non-transitory, tangible, machine-readable media that when run by one or more processors may cause the one or more processors to perform one or more of the processes 402-412. In some embodiments, method 400 may correspond to the method used by the module 330.

At step 402, an input document (e.g., 210) and a ground-truth summary (e.g., 215) from a training dataset may be received, e.g., via the data interface 315.

At step 404, sentences may be greedily selected from the document 210 that maximize the ROUGE scores with the reference summary 215. The ROUGE score maybe defined in (Lin, 2004), which is hereby expressly incorporated by reference herein in its entirety. This step constrains keywords to those found in important sentences.

At step 406, all the longest sub-sequences are identified in the extracted sentences that have matched sub-sequences in the ground-truth summary. This matching step may be similar to the copying word recognition method described in Gehrmann et al., Bottom-up abstractive summarization, in Proceedings of EMNLP, 2018, which is hereby expressly incorporated by reference herein in its entirety.

At step 408, duplicate words and stop words are removed from the sentences, and the remaining tokens are kept as keywords. Thus, compared to other existing keywords extraction methods which output only a few salient words, keyword extraction retains most content words found in the summary. This encourages dependence on the given keywords by building a reliable correlation between their presence in the input (e.g., the source article 210) and the target (e.g., the ground-truth summary). It in turn ensures that user-provided keywords are not ignored by the model at test time.

At step 410, the generated keyword sequence is then prepended to the source document, separated with a special token, and fed to the summarization model. In one embodiment, the keyword sequence maintains the order of the keywords as they were in the source document. In another embodiment, the keyword sequence may adopt a different order of the keywords as this ordering may frequently differ between the source document and the target summary. Keywords may also be separated from different source sentences with the special token ("|"). In applications where the sentence boundary is unknown, e.g., when users propose their own keywords, the "|" token can be ignored.

At step 412, the keywords-based model generates the probability distribution for a summary $p(y|x, z)$ conditioned on the input document x and the keywords z. The summarization model is then trained to maximize $p(y|x, z)$ in an end-to-end fashion. For example, the conditional probability distribution $p(y|x, z)$ of generated summaries from the summarization model is compared with the ground-truth summary to compute a cross-entropy loss, which may be used to update the summarization model via backpropagation.

In one embodiment, the keyword extraction strategy described in steps 404-408 may retain most words from the summary found in the source document. Without regularization, the dependence on such keywords is strong enough that the keyword-based summarization model 230 may rarely generate novel words in the summary. To remedy this, keywords may be randomly dropped at training time so that keyword-based summarization model 230 may learn to rely on keywords that are present in the keyword sequence that is part of the input of the model, while also learning to still carry over key information from the source document that is not present in the keyword sequence. Note that keywords dropout may be applied at training time only.

Figure 5:
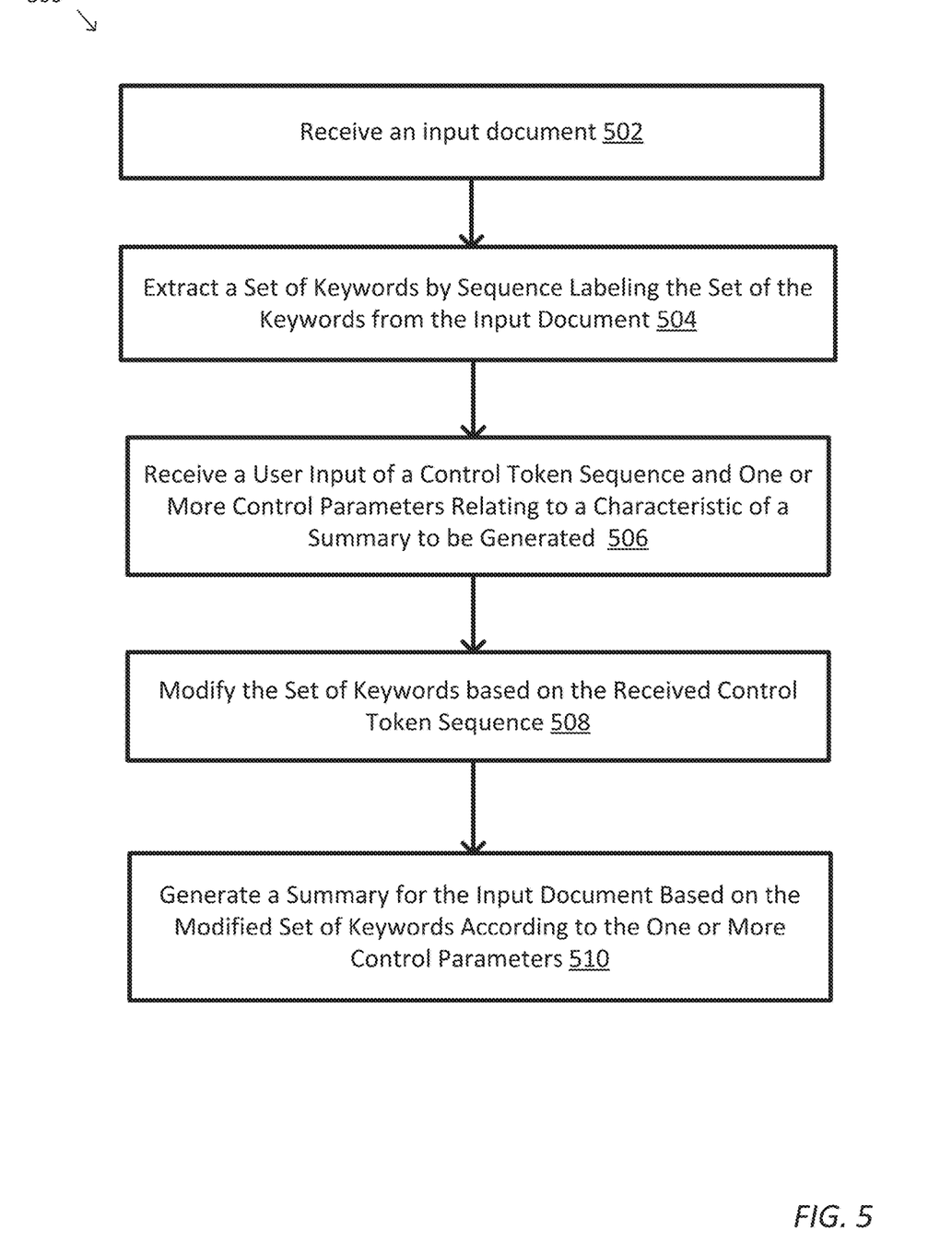
FIG. 5 is a simplified logic flow diagram illustrating a method for generating a controlled summary using the keywords-based model shown in FIG. 2 during inference stage, according to some embodiments described herein.

FIG. 5 is a simplified logic flow diagram illustrating a method for generating a controlled summary using the keywords-based model shown in FIG. 2 during inference stage, according to some embodiments described herein. One or more of the processes 502-514 of method 500 may be implemented, at least in part, in the form of executable code stored on non-transitory, tangible, machine-readable media that when run by one or more processors may cause the one or more processors to perform one or more of the processes 502-514. In some embodiments, method 500 may correspond to the method used by the module 330.

At step 502, an input document (e.g., document 210) may be received. For example, the input summary may be received at data interface 315 in FIG. 3.

At step 504, a set of keywords may be extracted from the input document, e.g., by sequence labeling the keywords. For example, keyword extraction at inference time may be formulated as a sequence labeling task. Concretely, a BERT-based sequence tagger (e.g., 220) may have been optionally trained on the keywords and documents from the training dataset. The BERT-based sequence tagger 220 may be similar to the BERT model described in Devlin et al., BERT: Pre-training of deep bidirectional transformers for language understanding. arXiv preprint arXiv:1810.04805, 2018, which is hereby expressly incorporated by reference herein in its entirety. This tagger may then compute the selection probability $q_j$ for each token in the test document. Similar to training time keyword extraction (as described in steps 404-408 in FIG. 4), a set of $n_s$ sentences with the highest average token selection probability are selected from the input source document. Within these sentences words with $q_j > \varepsilon$ are selected as keywords up to a maximum number of $m_{max}$. The three hyperparameters $n_s$, $\varepsilon$, $m_{max}$ may be selected based on the uncontrolled summarization performance on validation datasets. The results are reasonably robust to different settings.

At step 506, a user input of a control token sequence and/or one or more control parameters relating to a characteristic of the summary to be generated may be received to modify the set of keywords into a customized set of keywords, e.g., via the control center 232 in FIG. 2. During inference time, the user 150 may provide different configurations of control tokens 232 reflecting keyword control to entity and length of the summary.

At step 508, the set of keywords is modified based on the received control token sequence.

At step 510, a summary may be generated for the input document based on the set of customized set of keywords according to the one or more control parameters. For example, entity control may produce summaries that focus on entities of interest. Example summaries 235a-c provide different versions of summaries focusing on different players when those player names are included as keywords directly influencing the respective summary.

For another example, the user may have different preferences as to the length of summaries, which may be controlled by a user-specified length parameter. Specifically, the training data may be separated into 5 buckets signified by different summary lengths so that each bucket has the same number of examples. Then the average number of keywords $K_l$ may be computed for each bucket on the training data. At test time, a user 150 can specify length parameter $l \in \{0, 1, 2, 3, 4\}$ to include the $K_l$ number of keywords with the highest selection probability computed by the sequence tagger 220.

In one embodiment, prompts (e.g., 227 in FIG. 2) are utilized to perform multi-purpose text generation with a single unified model. Specifically, prompts may take the form of control token sequence, and such tokens can be used both as the target prefix and keywords. For example, the prompts can be used for summarizing contributions of scientific articles. Existing datasets about scientific papers such as arXiv collect paper abstracts as the summaries, which often include extra background context and lack detailed contribution descriptions for the associated paper. In many cases, readers would benefit from an explicit list of contributions in order to understand the novelty and value of the paper. For these cases, the prompt of control tokens such as "the main contributions of this paper are: (1)" may trigger generation of a summary focused on contributions. For another example, prompts may be used for summarizing invention purpose of patent documents. Patent article summaries in existing datasets such as BIG-PATENT can often be over-complicated, often covering core method details. Yet for a non-technical reader it would be preferred to provide a one-sentence summary that states the purpose of the invention while ignoring technical details. A prompt of "the purpose of the present invention is" may be used to trigger a concise summary of an input patent document focusing on patent purpose. For another example, question-guided summarization may be used to enhance reading comprehension of users. Human summarization can be constrained by questions that require answers to be found in the summary. This points to an important connection between summarization and reading comprehension. A summarization model may directly answer some questions about the article if guided properly. This suggests the possibility of subsuming reading comprehension as a form of summarization. To verify this hypothesis, the prompt of control tokens "Q: question [text]? A:" to trigger reading comprehension behavior in generating the summary.

Example Performance

FIG. 6 provides qualitative examples showing resulting summaries generated based on different user-controlled configuration parameters, according to one embodiment described herein. Example 601 shows a source document that is summarized into different versions of summary based on different control aspects, such as the entity names (e.g. "ISIS" "Hasd Al-Shaabi" as keywords), length, question and answer format, and/or the like. Example 602 shows a reference summary that is re-summarized by a prompt that has a contribution format, e.g., "the main contribution of this paper are . . . ". Example 603 shows a reference summary that is re-summarized by a prompt for the purpose of invention.

Additional examples illustrating the performance of the keyword-based model may be performed on distinct-domain summarization datasets: CNN/Dailymail (CNNDM) news articles, arXiv scientific papers (which is described in Cohan et al., A discourse-aware attention model for abstractive summarization of long documents. In Proceedings of NAACL (Short Papers), 2018), and BIGPATENT patent articles. For all datasets the source documents are truncated to 1024 tokens and the target summaries are truncated to 256 tokens following. The conditional distribution $p(y|x, z)$ in the keyword-based model is the fine-tuned version of the pretrained BARTLARGE model, which achieves comparable performance on several summarization benchmarks. The automatic keyword tagger at test time is based on the pretrained BERTLARGE model fine-tuned as described in in relation to FIG. 2. The summarization model implementation is based on the fairseq toolkit and the automatic keyword extraction model is based on the HuggingFace Transformers library.

For evaluation, the ROUGE scores and the recently proposed BERTScore (see Zhang et al., BERTScore: Evaluating text generation with BERT, in Proceedings of ICLR, 2020) are used when ground-truth is available. For control-related evaluation where reference summaries may not be available, (1) ground-truth summaries are collected when possible, (2) summaries are examined to respect the control signal, or (3) resort to human evaluation.

To test the performance of entity control, user preference is first simulated by providing the model with oracle entities extracted from the ground-truth target, and then compared to the model using automatic keywords in a uncontrolled setting to show the effect of oracle entities. To examine whether the decoded summaries respect entity change, 100 documents are sampled and repeatedly acquired every entity in the document to generate summaries. Then the Success Rate is computed, the fraction of requested entity actually occurring in the output summaries. The results are reported in separation of whether the entity is from leading 3 sentences or from the full article. To test if the summaries from different entity input are factually consistent with the document, another 100 documents are sampled, and for each one "important" entity that appears in the reference is randomly sampled, and one "unimportant" entity that occurs neither in the reference nor the leading three source sentences to produce summaries. For each (article, summary) pair 3 annotators from Amazon Mechanical Turk are adopted to make a binary decision as to whether the summary can be entailed from the article. The majority vote is then taken as the result and report the fraction of factually correct summaries. Evaluation is done on CNNDM only since many examples in arXiv and BIGPATENT do not have identifiable entities.

Figure 7:
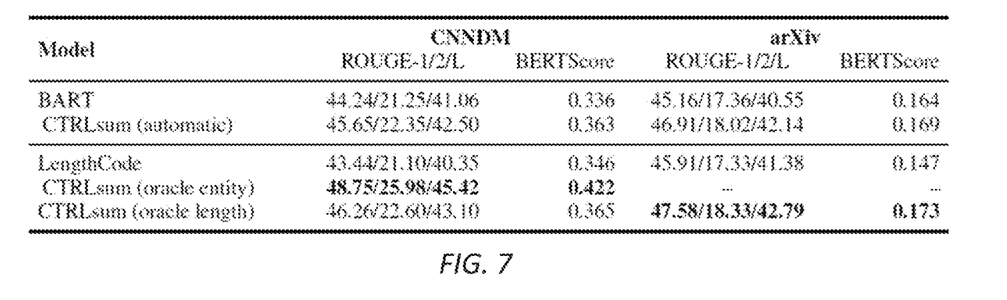
FIGS. 7-14 provide example data charts illustrating example testing performance of the keywords-based model described herein compared with existing models, according to some embodiments described herein.
Figure 8:
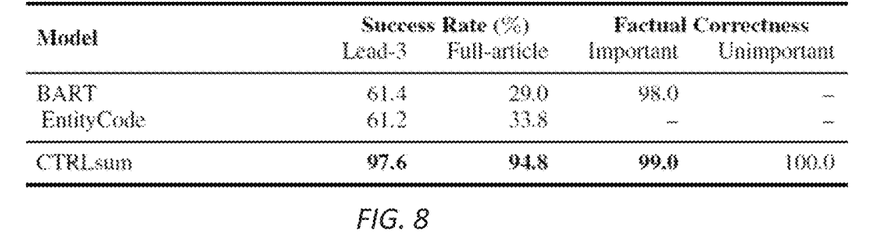

FIG. 7 illustrates the example performance of the keywords-based model (referred to as CTRLsum) comparted with BART. It is observed that the use of oracle entities helps boost the ROUGE-2 score by 3.6 points compared with using automatic keywords, which means CTRLsum is able to take advantage of the given entities. FIG. 8 shows the Success Rate and factual correctness evaluations. Remarkably, the keyword-based model described herein (CTRLsum) achieves a high success rate for both lead-3 and full-article entities reaching around 95%. Yet other systems struggle to include the given entities especially for the ones that do not occur in the beginning of the article. Factual correctness scores from human annotators suggest that CTRLsum is able to generate factually consistent summaries no matter whether the entity of interest is important or not, comparable to the unconstrained BART baseline.

Similar to entity control, we first examine the effect of oracle length signal from the reference to simulate user preference. In addition to ROUGE and BERTScore, we measure the length distance between the decoded summary and the reference following (Liu et al., 2018). Specifically, the mean of absolute deviation (MAD) of the actual length bucket code $l_{sys}$ of the decoded summary is computed from the ground-truth control code $l_{ref}$, as $$\frac{1}{N}\sum_{1}^{N}|l_{sys}^{(n)} - l_{ref}^{(n)}|.$$

To assess the summary variations as length signals change, 1000 documents are further sampled and decoded 5 different-length summaries for each document. Then the Pearson Correlation Coefficient (PCC) is reported between the input bucket code and actual bucket code. Experiments are conducted on CNNDM and arXiv.

Figure 9:
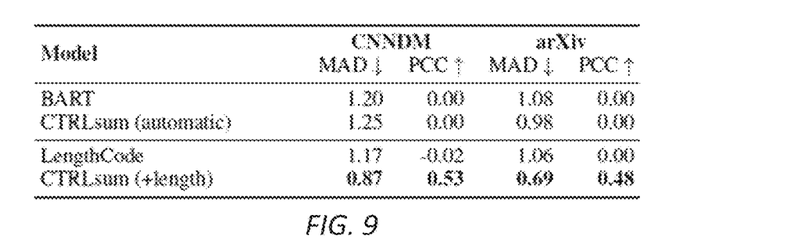

In FIG. 7, CTRLsum with oracle length signals only presents relatively small gains over the automatic CTRLsum baseline. This implies that oracle lengths only convey limited additional information to help generate the reference summary. The LengthCode baseline is run based on BART, where the ground-truth length bucket code is prepended to the article at both training at test time. However, LengthCode fails to consistently improve over BART with oracle length signals. Moreover, the BART model fine-tuned with LengthCode method almost ignores the length signal with PCC close to 0, as shown in FIG. 9. This is not very surprising since length code would be less useful when the summarizers grow stronger, which can already learn a good length predictor implicitly. In contrast, CTRLsum with length-guided keywords achieves high positive PCC between control signal and actual output length, and is able to reduce the length deviation MAD compared to automatic baselines.

There is no existing dataset to evaluate contribution summarization of scientific papers, bringing challenges to our evaluation. However, researchers often summarize the bullet contributions of their paper in the Introduction section, which inspire us to extract such contribution claims as the reference summary. Therefore, the entire arXiv database,2 and download all the papers whose first submission time is within the first six months of 20193 of 67K papers. Introduction section and bullet contributions are extracted with regular expression and filter out the ones that fail. The contributions are used as the reference and the Introduction section after removing the contribution claims is used as the source article to predict contributions from the rest of the introduction section. This procedure leads to 1018 test examples. The model is trained and tested on arXiv.

For purpose summarization setup, to collect a test dataset that features one-sentence invention purpose summaries, 1000 test examples are sampled from BIGPATENT and present their reference summaries to human annotators from Amazon Mechanical Turk. For each example one annotator is asked to select the sentence that convey the purpose of the invention. The option is also provided for annotators that the invention purpose cannot be identified. After filtering out the invalid examples, 763 examples are collected as test data.

Figure 11:
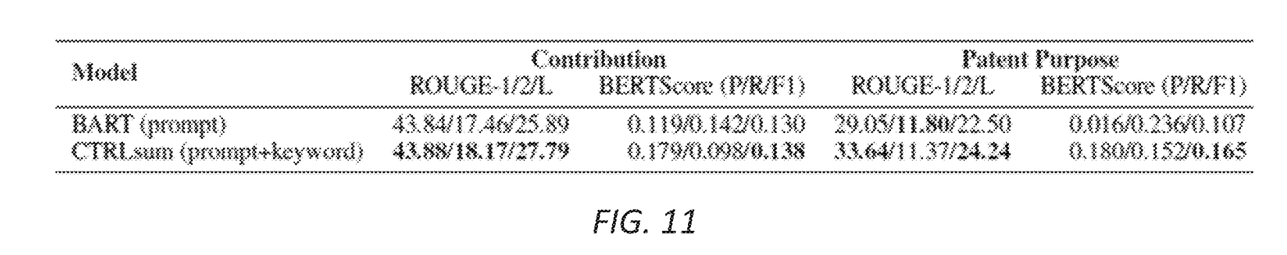

FIG. 11 shows results of contribution summarization on scientific papers and invention purpose summarization on patent filings. Through using the prompt text as both the decoder prefix and keywords, CTRLsum outperforms the BART baseline in most cases. We further report the precision (P) and recall (R) scores in BERTScore besides F1. It is observed that the BART baseline tends to over-generate a full summary with low precision scores while CTRLsum is able to focus on keywords-related content.

Question-guided summarization is tested on reading comprehension benchmarks in a zero-shot setting. Specifically, the CNNDM summarization models are evaluated on in-domain NewsQA and out-of-domain SQuAD 1.1 respectively. Some NewsQA test articles are present in the CNNDM summarization training dataset, as it is still a reasonable unsupervised setting since the keyword-based model never sees questions or answers during training. In addition to comparing with the vanilla BART model, the zero-shot performance from GPT2 language models (without fine-tuning) is included as a reference point. The largest GPT2 model is omitted with 1.5B parameters since it cannot be evaluated in a single GPU device due to memory limits. F1 scores are reported on the two benchmarks.

Figure 10:
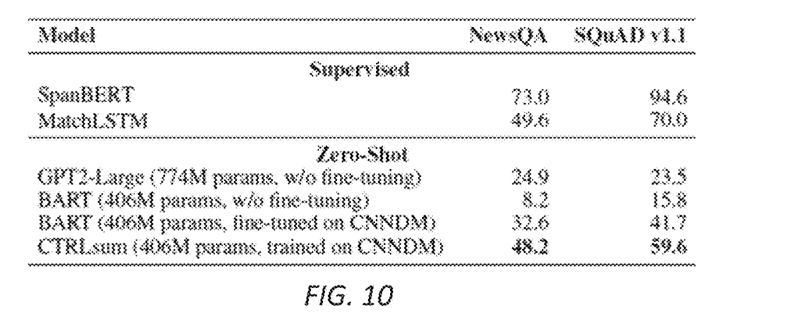

BART is pretrained with a denoising task to predict the denoised version of the source, and performs poorly on zero-shot reading comprehension out of box, as shown in FIG. 10. Interestingly, however, BART fine-tuned on a summarization task—without seeing any question-answer pairs in the training data—is able to improve the F1 scores by 24.4 and 25.9 points on NewsQA and SQuAD respectively. Moreover, CTRLsum equipped with question keywords is able to further boost the performance by 15.6 and 17.9 points, approaching the supervised MatchLSTM score on NewsQA. Such results suggest that summarization might be a suitable transfer task for abstractive reading comprehension.

Figure 12:
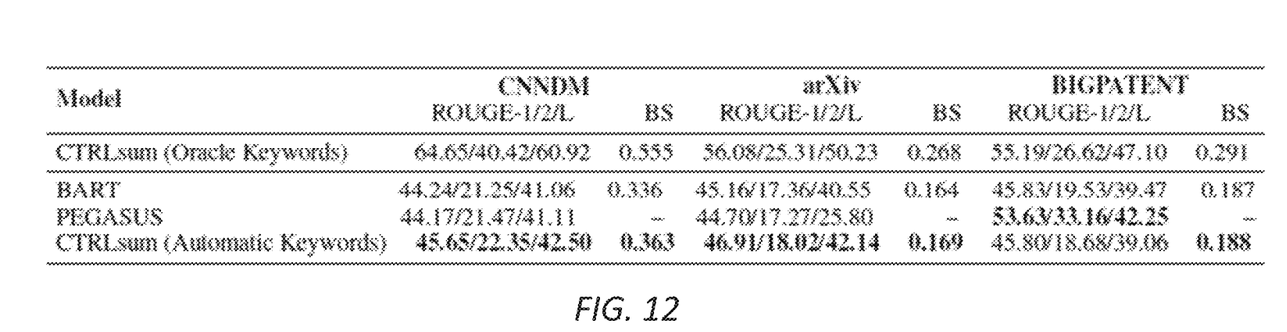

FIG. 12 shows the uncontrolled summarization performance without any user input, which uses the automatically extracted keywords as described in relation to FIG. 2. On CNNDM and arXiv datasets CTRLsum outperforms the strong BART and PEGASUS baselines by a large margin, leading to new state-of-the-art performance on CNNDM. It also performs comparably to the BART baseline on BIG-PATENT in terms of BERTScore, though with an inferior ROUGE-2 score. Yet there is a big performance gap between BART-based models and PEGASUS on BIGPATENT. The reasons might be different dataset processing,4 sub-optimal learning schedule, or inherent difference between BART and PEGASUS.

Figure 13:
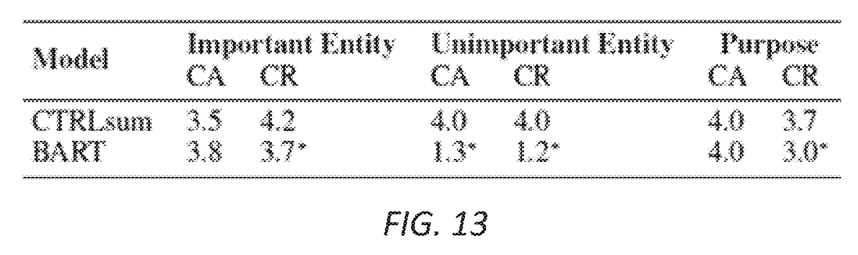

For controlled summarization, further human evaluation results to evaluate "control" directly by informing annotators the intended control signal. Experiments are conducted on entity and purpose control. Specifically, the annotators are informed of intents (to obtain summaries focused on a specific entity or purpose of patent), then the annotators provide scores in scale 1-5 over two dimensions: (1) Control Accuracy (CA): whether the summary contains accurate main information with respect to the intent, and (2) Control Relevance (CR): how the summary is relevant to the control intent overall—a summary that contains redundant contents that are unrelated to the intent will be penalized. Results including significance tests are shown in FIG. 13. The control accuracy for important entity control and purpose control are comparable between BART and CTRLsum without significant difference (p-value>0.05), while CTRLsum shows significantly better control relevance overall by focusing on the desired information. Also, the unconstrained BART are unable to generate unimportant-entity-related summaries and thus suffers from poor scores on both dimensions.

Figure 14:
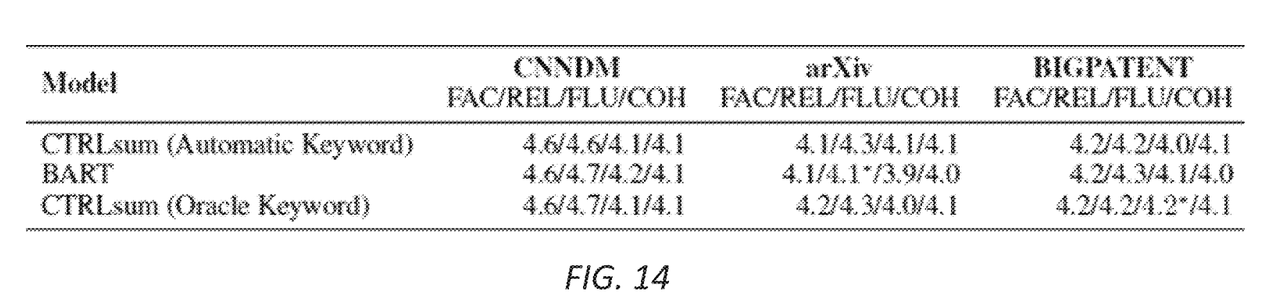

For uncontrolled summarization, human annotators from Amazon Mechanical Turk score summaries (scale 1-5) over four dimensions: (1) Factual Consistency (FAC): the summary should only contain statements that can be entailed by the source document, (2) Relevance (REL): the summary should only contain important information of the source document, (3) Fluency (FLU): each sentence in the summary should be fluent, and (4) Coherence (COH): the summary should be well-structured and well-organized. Results including significance tests are present in FIG. 14. The quality of summaries from all systems on all dimensions is generally good with a score mostly higher than 4.0. However, most scores do not show significant difference from CTRLsum (Automatic Keyword) with large p-values, despite their very different similarities against the reference summaries in terms of ROUGE/BERTScore (e.g. CTRLsum with oracle keywords). This implies that the summary quality from different systems powered by strong pretrained models like BART has become difficult to be clearly distinguished by non-expert MTurkers. It is also noted that non-expert human judgement for summarization may be unreliable and exhibit poor correlation with expert judgement.

Some examples of computing devices, such as computing device 200 may include non-transitory, tangible, machine readable media that include executable code that when run by one or more processors (e.g., processor 210) may cause the one or more processors to perform the processes of method 400. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of controllable text summarization of a document, the method comprising:
   receiving, at a communication interface, an input text document;
   extracting, via a language model that is trained by a training dataset of a plurality of documents and a plurality of corresponding keywords, one or more keywords by sequence labeling the one or more keywords from the input text document;
   receiving, via a user interface, a control token sequence and one or more control parameters relating to a characteristic of a summary to be generated, wherein the characteristic of the summary includes any of: an entity mentioned in the input text document, a target length of the summary, and a type of the input text document, and wherein the one or more control parameters comprises a prompt corresponding to the type of the input text document;
   modifying the one or more keywords based on the received control token sequence; and
   generating, by the language model, the summary for the input text document based on the modified one or more keywords according to the one or more control parameters.

2. The method of claim 1, wherein the prompt is selected from the group of: a first summary prefix that summarizes contributions of a research paper; a second summary prefix that summarizes invention purpose of a patent document; and a third summary prefix that summarizes the input text document in a guided question and answer format.

3. The method of claim 1, further comprising:
   generating a first set of modified keywords and a first control parameter from the received control token sequence;

generating, by the language model, a first version of the summary for the input text document based on the first set of modified keywords according to the first control parameter;

generating a second set of modified keywords and a second control parameter from the received control token sequence; and generating, by the language model, a second version of the summary for the input text document based on the second set of modified keywords according to the second control parameter.

4. The method of claim 1, wherein the language model is trained by:

prepending a keyword sequence to a training source document separated with a special token;

inputting the training source document with the keyword sequence to the language model;

generating, by the language model, an output summary; and updating the language model by maximizing a conditional probability of an output summary conditioned on the training source document and the keyword sequence.

5. The method of claim 4, further comprising:

randomly dropping a subset of keywords from the keyword sequence during training.

6. A system of controllable text summarization of a document, the system comprising:

a communication interface that receives an input text document;

a memory that stores a language model that is trained by a training dataset of a plurality of documents and a plurality of corresponding keywords; and one or more hardware processors that:

extracts, via the language model, one or more keywords by sequence labeling the one or more keywords from the input text document;

receives, via the communication interface, a control token sequence and one or more control parameters relating to a characteristic of a summary to be generated, wherein the characteristic of the summary includes any of: an entity mentioned in the input text document, a target length of the summary, and a type of the input text document, and wherein the one or more control parameters comprises a prompt corresponding to the type of the input text document;

modifies the one or more keywords based on the received control token sequence; and generates, by the language model, the summary for the input text document based on the modified one or more keywords according to the one or more control parameters.

7. The system of claim 6, wherein the prompt is selected from the group of: a first summary prefix that summarizes contributions of a research paper; a second summary prefix that summarizes invention purpose of a patent document; and a third summary prefix that summarizes the input text document in a guided question and answer format.

8. The system of claim 6, wherein the one or more hardware processors further:

generates a first set of modified keywords and a first control parameter from the received control token sequence;

generates, by the language model, a first version of the summary for the input text document based on the first set of modified keywords according to the first control parameter;

generates a second set of modified keywords and a second control parameter from the received control token sequence; and generates, by the language model, a second version of the summary for the input text document based on the second set of modified keywords according to the second control parameter.

9. The system of claim 6, wherein the language model is trained by:

prepending a keyword sequence to a training source document separated with a special token;

inputting the training source document with the keyword sequence to the language model;

generating, by the language model, an output summary; and updating the language model by maximizing a conditional probability of an output summary conditioned on the training source document and the keyword sequence.

10. The system of claim 9, wherein the one or more hardware processors further:

randomly drops a subset of keywords from the keyword sequence during training.

11. A non-transitory processor-readable medium storing a plurality of processor-executable instructions for controllable text summarization of a document, the instructions being executed by one or more processors to perform operations comprising:

receiving, at a communication interface, an input text document;

extracting, via a language model that is trained by a training dataset of a plurality of documents and a plurality of corresponding keywords, one or more keywords by sequence labeling the one or more keywords from the input text document;

receiving, via a user interface, a control token sequence and one or more control parameters relating to a characteristic of a summary to be generated, wherein the characteristic of the summary includes any of: an entity mentioned in the input text document, a target length of the summary, and a type of the input text document, and wherein the one or more control parameters comprises a prompt corresponding to the type of the input text document;

modifying the one or more keywords based on the received control token sequence; and generating, by the language model, the summary for the input text document based on the modified one or more keywords according to the one or more control parameters.

12. The non-transitory processor-readable of claim 11, wherein the prompt is selected from the group of: a first summary prefix that summarizes contributions of a research paper; a second summary prefix that summarizes invention purpose of a patent document; and a third summary prefix that summarizes the input text document in a guided question and answer format.

13. The non-transitory processor-readable of claim 11, wherein the operations further comprise: generating a first set of modified keywords and a first control parameter from the received control token sequence; generating, by the language model, a first version of the summary for the input text document based on the first set of modified keywords according to the first control parameter; generating a second set of modified keywords and a second control parameter from the received control token sequence; and generating, by the language model, a second version of the summary for the input text document based on the second set of modified keywords according to the second control parameter.

14. The non-transitory processor-readable of claim 11, wherein the language model is trained by:
- prepending a keyword sequence to a training source document separated with a special token;
- randomly dropping a subset of keywords from the keyword sequence during training;
- inputting the training source document with the keyword sequence to the language model;
- generating, by the language model, an output summary; and
- updating the language model by maximizing a conditional probability of an output summary conditioned on the training source document and the keyword sequence.

* * * * *